US006739181B2

United States Patent
Honda

(12) United States Patent
(10) Patent No.: US 6,739,181 B2
(45) Date of Patent: May 25, 2004

(54) COMBUSTION DETECTING APPARATUS OF ENGINE

(75) Inventor: Takayoshi Honda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/261,783

(22) Filed: Oct. 2, 2002

(65) Prior Publication Data
US 2003/0097870 A1 May 29, 2003

(30) Foreign Application Priority Data
Nov. 28, 2001 (JP) .......................... 2001-362656

(51) Int. Cl.⁷ ............................................ G01M 15/00
(52) U.S. Cl. ..................................................... 73/35.08
(58) Field of Search .............................. 73/35.01, 35.03, 73/35.06, 35.07, 35.08, 116, 117.2, 117.3; 701/111; 324/378, 379

(56) References Cited

U.S. PATENT DOCUMENTS

| 5,178,001 A | | 1/1993 | Ikeuchi et al. | |
|---|---|---|---|---|
| 5,230,240 A | | 7/1993 | Ohsawa et al. | |
| 5,337,716 A | | 8/1994 | Fukui et al. | |
| 5,343,844 A | | 9/1994 | Fukui et al. | |
| 5,925,819 A | * | 7/1999 | Yoshinaga et al. | 73/117.3 |
| 6,075,366 A | * | 6/2000 | Yasuda | 324/380 |
| 6,118,276 A | * | 9/2000 | Nakata et al. | 324/464 |
| 6,186,129 B1 | * | 2/2001 | Butler, Jr. | 123/620 |
| 6,202,474 B1 | * | 3/2001 | Takahashi et al. | 73/35.08 |
| 6,360,587 B1 | * | 3/2002 | Noel | 73/35.08 |
| 6,550,456 B1 | * | 4/2003 | Uchida et al. | 123/479 |
| 6,614,230 B2 | * | 9/2003 | Raichle et al. | 324/399 |
| 6,615,645 B1 | * | 9/2003 | Butler et al. | 73/117.3 |
| 6,666,069 B2 | * | 12/2003 | Raichle et al. | 73/35.08 |
| 2001/0017055 A1 | * | 8/2001 | Raichle et al. | 73/116 |
| 2002/0144539 A1 | * | 10/2002 | Yorita et al. | 73/35.08 |
| 2003/0196481 A1 | * | 10/2003 | Okamura et al. | 73/118.1 |

FOREIGN PATENT DOCUMENTS

| JP | 11-13616 | 2/1999 |
|---|---|---|
| JP | A-11-11-50941 | 2/1999 |
| JP | B2-2942351 | 6/1999 |

* cited by examiner

Primary Examiner—Eric S. McCall
(74) Attorney, Agent, or Firm—Nixon & Vanderhye P.C.

(57) ABSTRACT

An apparatus for determining combustion condition of engine detects ion current flowing in a spark plug. The apparatus samples the ion current by carrying out A/D conversion at every constant time period. The apparatus stores a maximum value of A/D converted values as a peak hold value. The apparatus further detects and stores that the ion current traverses a reference voltage during the A/D conversion time period. The apparatus clears the peak hold value, if the ion current traverses the reference voltage. The apparatus determines the combustion condition based on the peak hold value which has not been cleared continuously over a predetermined number of times of the A/D conversion. It is possible to reduce influence of noise.

14 Claims, 11 Drawing Sheets

COMBUSTION DETECTING APPARATUS OF ENGINE

CROSS REFERENCE TO RELATED APPLICATION

This application is based on Japanese Patent Application No. 2001-362656 filed on Nov. 28, 2001 the contents of which are incorporated herein by reference.

BACKGROUND OF THE INVENTION

1. Field of the Invention

The present invention relates to a combustion detecting apparatus of an engine for determining a combustion condition of the engine based on ion current.

2. Description of Related Art

Conventionally, in order to detect a combustion condition of an engine, there has been developed a technology of detecting ion current flowing in an electrode of an spark plug at each ignition and determining firing/misfire or the like based on an ion current detecting signal thereof.

Further, as a combustion detecting apparatus of an engine using a technology of this kind, according to, for example, JP-A-11-13616, there is described an apparatus in which an ion current detecting signal is inputted to a filter for passing only a signal equal to or larger than a predetermined threshold and having a width equal to or larger than a predetermined time period, an output signal of the filter is inputted to a peak hold circuit, an output of the peak hold circuit is subjected to A/D conversion at a predetermined timing after ignition (for example, timing of ATDC60° CA), when the A/D conversion value (that is, a peak hold value of the output signal of the filter by the peak hold circuit) is equal to or larger than a determining reference value, a firing is determined, otherwise, a misfire is determined.

However, there poses the following problem according to the apparatus described in the publication.

That is, the peak hold circuit is constructed by a constitution of storing electric charge in a capacitor and therefore, when peak hold time is long, by leak current of the circuit or discharging the electric charge of the capacitor, peak hold voltage is lowered and a correct peak hold value is not provided. Particularly, when the output of the peak hold circuit is subjected to A/D conversion at a timing of a specific crank angle after ignition (ATDC60° CA in the above-described example), in accordance with rotational speed (rotational number) of the engine, the lower the rotational number, the longer the time period from ignition to the timing of the specific crank angle and therefore, the peak hold voltage is liable to lower. Therefore, the apparatus is disadvantageous in accurately determining the combustion condition of the engine.

Hence, it is conceivable to construct a constitution as shown by FIG. 16 without using an analog peak hold circuit.

That is, first, the ion current detecting signal is inputted to a low pass filter 101 and an output signal of the low pass filter 101 is subjected to A/D conversion at every constant time period by an A/D converter 103. Further, it is conceivable to adopt a constitution in which CPU 105 carries out a peak hold processing of calculating a maximum value (peak value) of an A/D conversion value at the every constant time period by the A/D converter 103, compares a maximum value provided in the peak hold processing with a predetermined determinant (threshold) Vth, determines a firing when the maximum value is larger and determines a misfire otherwise.

However, in the case of the constitution, as exemplified in FIG. 17, (b), (c), and (d), there is a case in which a period of generating noise in the ion current detecting signal and an A/D conversion timing by the A/D converter 103 are synchronized. In this case, a signal of the noise is erroneously determined as a signal indicating a firing. That is, even in the case of a misfire, the misfire is erroneously determined as a firing. Further, in FIG. 17, (b), (c) and (d), the A/D conversion timing is indicated by a black circle mark (●). In FIG. 17, (b) shows normal combustion. In FIG. 17, (c) shows the case of a misfire. In FIG. 17, (d) shows a case of increasing the time constant of the low pass filter. In FIG. 17, (a) shows an ignition signal and time t0 is the ignition timing.

Therefore, although it is conceivable to construct a constitution of setting an A/D conversion period (time interval of A/D conversion) to be short and determining whether a noise signal is constituted from a state of changing each A/D conversion value, there is needed an A/D converter capable of carrying out high-speed A/D conversion or CPU capable of carrying out high-speed processing, which results in a significant increase in cost.

Further, although it is also conceivable to enhance a filter effect (voltage smoothing effect) of the low pass filter 101, thereby, as exemplified in (d) of FIG. 17, an original waveform of the ion current detecting signal is significantly blunted, an accurate peak hold value is not provided and therefore, the combustion condition cannot accurately be determined.

Meanwhile, the above-described respective problem is not limited to the constitution of subjecting the ion current detecting signal to peak holding but is similarly posed also in the case of, for example, an integrating constitution. That is, in the apparatus described in the publication, even in the case of providing an integrating circuit in place of the peak hold circuit and determining firing/misfire based on an output of the integrating circuit, the integrating circuit is constructed by a constitution of storing electric charge in a capacitor and therefore, when an integrating time period is long, output voltage in correspondence with an integrated value is lowered and a correct integrated value is not provided. Further, in the constitution of FIG. 16, even in a case in which CPU 105 carries out an integrating processing for calculating an integrated value of the A/D conversion value at every constant time period and determining firing/misfire based on the integrated value provided by the processing, the problems described in reference to FIG. 17, (b), (c) and (d) are similarly posed.

SUMMARY OF THE INVENTION

The invention has been carried out in view of the problems and it is an object thereof to provide a combustion detecting apparatus capable of accurately determining a combustion condition of an engine from an ion current detecting signal without shortening an A/D conversion period for excluding influence of noise.

According to an aspect of the invention, ion current detecting means detects an ion current flowing in electrodes of a spark plug of the engine and outputs an ion current detecting signal of a voltage in accordance with the ion current. Further, A/D conversion means subjects the ion current detecting signal outputted from the ion current detecting means at every predetermined time period to A/D conversion and A/D conversion value storing means stores an A/D conversion value by the A/D conversion means.

Further, reference voltage producing means produces a reference voltage large or small of which is compared with the ion current detecting signal and voltage change storing means stores that the ion current detecting signal traverses the reference voltage by comparing the ion current detecting signal and the reference voltage.

Further, at every timing of subjecting the ion current detecting signal to A/D conversion by the A/D conversion means (A/D conversion timing), erasing means determines whether the ion current detecting signal is stored to traverse the reference voltage in the voltage change storing means, erasing a stored value of the A/D conversion value storing means prior to an A/D conversion timing at a current time and erasing a memory of the voltage change storing means when the ion current detecting signal is stored to traverse the reference voltage. Further, combustion condition determining means determines a combustion condition of the engine based on the stored value of the A/D conversion value storing means which has not been erased continuously over A/D conversion timings more than a predetermined number of times M by the erasing means.

Further, when the traversing of the reference voltage by the ion current detecting signal is defined as "traversing of the ion current detecting signal" or simply as "traversing", as the traversing, there are traversing in a first direction for traversing the reference voltage by the ion current detecting signal in a direction from a voltage side which does not indicate a firing to a voltage side which indicates a firing relative to the reference voltage and traversing in a second direction for traversing the reference voltage by the ion current detecting signal in a direction from a voltage side which indicates a firing to a voltage side which does not indicate a firing relative to the reference voltage and traversing of the ion current detecting signal constituting a storage object by the voltage change storing means, may be both of traversing in the first direction and traversing in the second direction or may be either one thereof.

A/D conversion value at every predetermined time period of the ion current detecting signal is stored by the A/D conversion value storing means. When there is produced traversing of the ion current detecting signal constituting the storage object by the voltage change storing means, at an A/D conversion timing immediately thereafter, a stored value of the A/D conversion value storing means therebefore is erased by the erasing means. Further, according to the combustion detecting apparatus, the combustion condition of the engine is determined based on the stored value of the A/D conversion value storing means which has not been erased continuously over A/D conversion timings more than a predetermined number of times M by the erasing means.

Therefore, when there is produced traversing of the ion current detecting signal constituting the storage object by the voltage change storing means during a time period in which A/D conversion of the ion current detecting signal is executed at least by "M+1" times, the A/D conversion value at the A/D conversion timing until that time is not used for determining the combustion condition of the engine. Further, in the case in which there is not produced traversing of the ion current detecting signal constituting the storage object by the voltage change storing means during A/D conversion timings larger than M times, the combustion condition of the engine is determined from the A/D conversion value during the time period.

According to the combustion detecting apparatus, even when there is produced noise having a period equal to or smaller than an A/D conversion period in the ion current detecting signal, an A/D conversion value of the noise is not used for determining the combustion condition. An erroneous determination can be prevented without shortening the A/D conversion period, the A/D conversion period can be set to be long and therefore, processing load of A/D conversion and for storing the A/D conversion value can be alleviated.

According to another aspect of the invention, similar to the combustion detecting apparatus according to the first aspect, the ion current detecting means detects the ion current flowing in the electrodes of the spark plug of the engine and outputs the ion current detecting signal of the voltage in accordance with the ion current and the A/D conversion means subjects the ion current detecting signal outputted from the ion current detecting means to A/D conversion at every predetermined time period. Further, the reference voltage producing means produces the reference voltage the large or small of which is compared with the ion current detecting signal.

Voltage change informing means informs that the ion current detecting signal traverses the reference voltage in a first direction constituting a direction from a voltage side which does not indicate a firing to a voltage side which indicates a firing relative to the reference voltage (traversing in the first direction) and that the ion current detecting signal traverses the reference voltage in a second direction constituting a direction from the voltage side which indicates a firing to the voltage side which does not indicate a firing relative to the reference voltage (traversing in the second direction) by comparing the ion current detecting signal and the reference voltage.

Further, A/D conversion value storing means stores an A/D conversion value by the A/D conversion means during a time period from informing traversing in the first direction to informing traversing in the second direction by the voltage change informing means.

Further, determining means determines whether a number of times of A/D conversion by the A/D conversion means from informing traversing in the first direction to informing traversing in the second direction by the voltage change informing means, is larger than a predetermined number of times N.

Further, combustion condition determining means determines the combustion condition of the engine based on a stored value of the A/D conversion value storing means when it is determined that the number of times of A/D conversion is larger than the predetermined number of times N by the determining means.

When the ion current detecting signal traverses the reference voltage in the second direction until A/D conversion of the ion current detecting signal is executed at least by "N+1" times since the ion current detecting signal traverses the reference voltage in the first direction, the A/D conversion value at the A/D conversion timing until that time, is not used for determining the combustion condition of the engine. Further, when there are present A/D conversion timings more than N times during a time period of traversing the reference voltage in the first direction to traversing the reference voltage in the second direction by the ion current detecting signal, the combustion condition of the engine is determined from the A/D conversion value during the time period.

Therefore, also by the combustion detecting apparatus, even when there is produced noise having a period equal to or smaller than the A/D conversion period in the ion current detecting signal, signal of the noise is not erroneously determined to be a signal indicating a firing. Further, the erroneous determination can be prevented without shortening the A/D conversion period, the A/D conversion period can be set to be long and therefore, the processing load of A/D conversion and for storing the A/D conversion value can be alleviated.

The A/D conversion means, the A/D conversion value storing means and the determining means may be operated only in a detecting window suitable for determining the combustion condition of the engine.

It is preferable to set the detecting window to start from a predetermined timing after an ignition timing (for example, a timing at which a predetermined time period has elapsed from the ignition timing or a timing of a predetermined crank angle after the ignition timing). This is because generally, in ignition, there is produced a noise having a narrow width by LC resonance of an ignition coil and thereafter, the ion current by a firing is produced and a time period of producing such a noise can effectively be avoided.

The A/D conversion value storing means may be constituted to detect a maximum value of the A/D conversion value by the A/D conversion means and store the maximum value. That is, although the A/D conversion value storing means can be constituted to successively store the A/D conversion value per se by the A/D conversion means, memory capacity can be reduced by executing peak hold processing of updating and storing only the maximum value of each A/D conversion value.

The A/D conversion value storing means may be constructed a constitution in which the A/D conversion value by the A/D conversion means is integrated and an integrated value thereof is stored.

The combustion condition determining means may be constituted to compare a determinant which is larger in a direction of indicating a firing than a tolerance range in designing the reference voltage generated by the reference voltage generating means and a determinant set in accordance with a state of operating the engine, and a stored value of the A/D conversion value storing means to thereby determine the combustion condition of the engine.

In finally determining the combustion condition of the engine, there is used the determinant set in accordance with the state of operating the engine and therefore, the combustion condition of the engine can be accurately determined. Further, accuracy of the reference voltage produced by the reference voltage producing means may be low and therefore, low cost formation of the reference voltage producing means can be achieved.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

An explanation will be given of a combustion detecting apparatus of an engine according to embodiments to which the invention is applied in reference to the drawings as follows.

Figure 1:
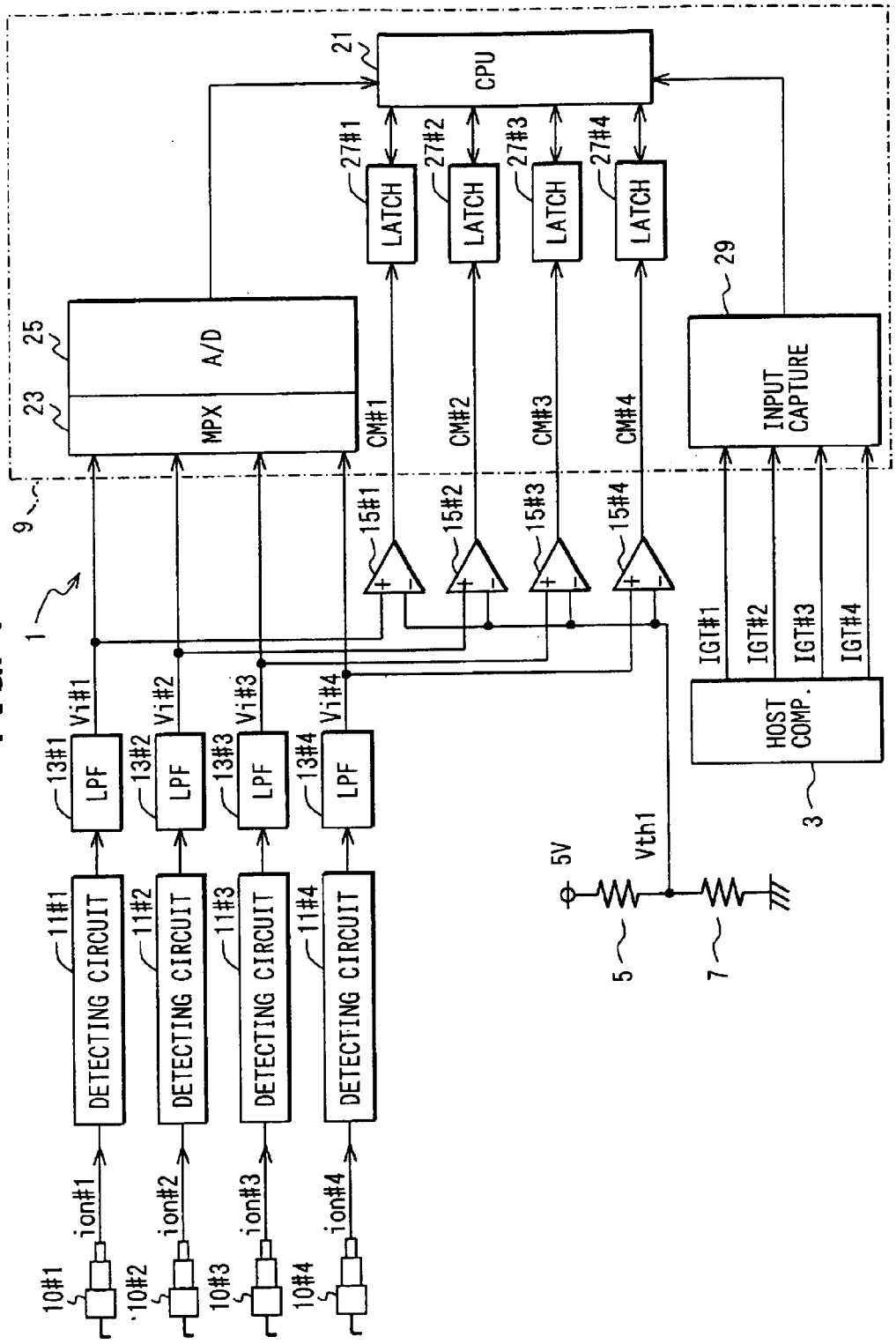
FIG. 1 is a constitution diagram showing a constitution of a combustion detecting apparatus according to a first embodiment along with a host microcomputer for controlling an engine.

First, FIG. 1 is a constitution diagram showing a constitution of a combustion detecting apparatus 1 according to a first embodiment along with a host microcomputer 3 for carrying out processings for controlling a four-cylinder gasoline engine as an internal combustion engine (hereinafter, simply referred to as engine). Further, in FIG. 1 and the following explanation, suffixes "#1 through #4" in notations attached to respective portions constituting the combustion detecting apparatus 1, currents and signals, indicate that the suffixes correspond to any of a first through a fourth respective cylinders #1 through #4.

As shown by FIG. 1, the combustion detecting apparatus 1 according to the first embodiment, is provided with ion current detecting circuits 11#1 through 11#4 for detecting ion currents ion#1 through ion#4 flowing in electrodes of respective spark plugs 10#1, 10#2, 10#3 and 10#4 provided at respective cylinders of the engine and outputting ion current detecting signals having voltages in accordance with the ion currents ion#1 through ion#4, and low pass filters (LPF) 13#1 through 13#4 for inputting the ion current detecting signals outputted from the ion current detecting circuits 11#1 through 11#4.

Further, the ion current detecting circuits 11#1 through 11#4 are publicly known as disclosed in JP-A-11-13616 and when spark discharge current is made to flow between the electrodes of the spark plug by a secondary coil of an ignition coil, each of the ion current detecting circuits detects ion current flowing in a direction opposed to the spark discharge current and outputs voltage in proportion to the ion current as the ion current detecting signal. Further, the low pass filters 13#1 through 13#4 are CR filters for removing more or less noise from output signals of the ion current detecting circuits 11#1 through 11#4 and filter constants thereof are set to be small such that original waveforms of the ion current detecting signals are not blunted. Therefore, in the following, the output signals of the low pass filters 13#1 through 13#4 (that is, signals which have passed the low pass filters 13#1 through 13#4) Vi#1 through Vi#4 are also referred to as ion current detecting signals.

Further, the combustion detecting apparatus 1 according to the first embodiment, is provided with two resistors 5 and 7 for generating reference voltage Vth1 (4.8 V according to the embodiment) large or small of which is compared with the ion current detecting signals Vi#1 through Vi#4 from the low pass filters 13#1 through 13#4 by dividing constant power source voltage (5V according to the embodiment), comparators 15#1 through 15#4 for inputting respectives of the ion current detecting signals Vi#1 through Vi#4 respectively by noninverting input terminals (+terminals) thereof and inputting the reference voltage Vth1 at inverting input terminals (−terminals), and a microcomputer 9 for carrying out processings for determining combustion conditions of the respective cylinders.

Further, the comparators 15#1 through 15#4 output a signal at a low level (=0 V) when voltages at the noninverting input terminals are smaller than the reference voltage Vth1 and output a signal at a high level (=5 V) when the voltages at the noninverting input terminals are equal to or higher than the reference voltage Vth1.

Further, the microcomputer 9 is provided with CPU 21 for executing programs, an A/D converter 25 for inputting the ion current detecting signals Vi#1 through Vi#4 from the low pass filters 13#1 through 13#4 via a multiplexor (MPX) 23 and subjecting the ion current detecting signals to A/D conversion, latch circuits 27#1 through 27#4 respectively inputted with output signals CM#1 through CM#4 of the comparators 15#1 through 15#4, and an input capture portion 29 inputted with ignition instruction signals IGT#1 through IGT#4 outputted from a host microcomputer 3.

Further, 1 bit data at an inner portion of each of the latch circuits 27#1 through 27#4, is set to 1 when there is produced a rise edge from a low level to a high level in the input signal or when there is produced a fall edge from a high level to a low level therein.

Therefore, when the ion current detecting signal Vi#n (n is any of 1 through 4), traverses the reference voltage Vth1 in a direction (corresponding to first direction) from a voltage side lower than the reference voltage Vth1 (corresponding to a voltage side which does not indicate a firing) to a high voltage side (corresponding to a voltage side which indicates a firing) to thereby produce the rise edge in the output signal CM#n of the comparator 15#n, or when the ion current detecting signal Vi#n traverses the reference voltage Vth1 in a direction (corresponding to a second direction) from a voltage side higher than the reference voltage Vth1 to a low voltage side to thereby produce the fall edge in the output signal CM#n of the comparator 15#n, the 1 bit data of the latch circuit 27#n is set to 1.

Further, the 1 bit data of the respective latch circuits 27#1 through 27#4, is cleared to 0 by CPU 21. Further, in the following, setting the 1 bit data of the latch circuit 27#n to 1, is also referred to as latch record.

Meanwhile, the input capture portion 29 produces an interruption request (so-to-speak request of input capture interruption, hereinafter, the interruption request is referred to as an ignition interruption request) to CPU 21 when there is produced a fall edge corresponding to an ignition timing at any of the ignition instruction signals IGT#1 through IGT#4 from the host microcomputer 3. Further, according to the embodiment, the ignition interruption request is prepared for each of the respective cylinders #1 through #4. Further, each of the ignition instruction signals IGT#1 through IGT#4 from the host microcomputer 3, is a drive signal for conducting electricity to a primary coil of the ignition coil in correspondence with the spark plug of the corresponding cylinder, current is made to flow in the primary coil when each of the signals IGT#1 through IGT#4 becomes high level, thereafter, when each of the signals IGT#1 through IGT#4 returns to a low level (that is, falls) and electricity conduction to the primary coil is cut, by the secondary coil of the ignition coil, spark discharge current is made to flow between the electrodes of the spark plug.

Next, an explanation will be given of processings executed by CPU 21 in reference to flowcharts of FIG. 2 through FIG. 4 and a time chart of FIG. 5. Further, although an explanation will be given here of a portion with regard to the first cylinder #1 in the respective cylinders #1 through #4, the same goes with the other cylinders #2 through #4.

Figure 5:
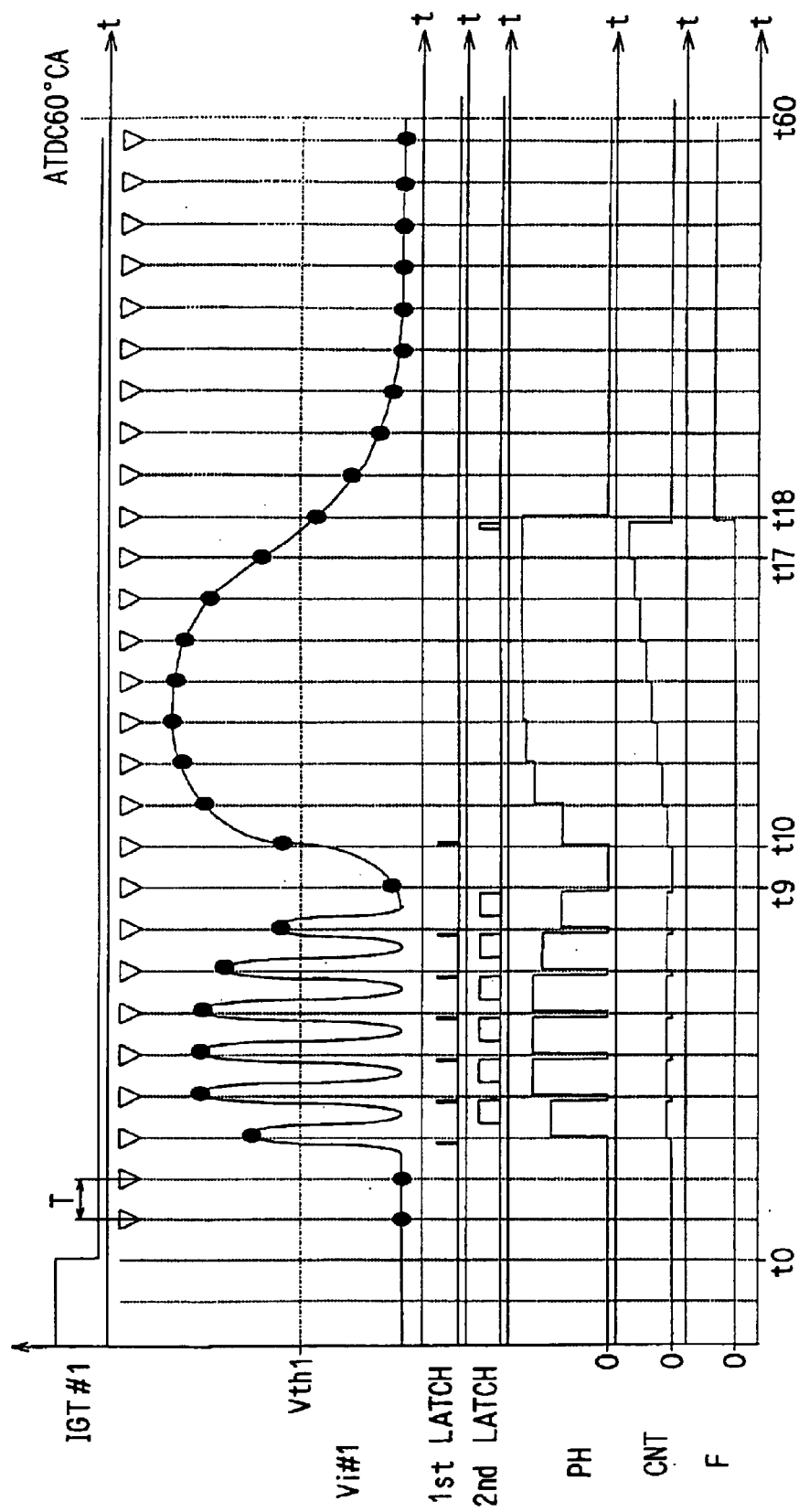
FIG. 5 is a time chart showing operation of the combustion detecting apparatus according to the first embodiment.

At time t0 in FIG. 5, the ignition instruction signal IGT#1 from the host microcomputer 3 falls and ignition with regard to the first cylinder #1 is carried out. In response to IGT#1, the ignition interruption request is produced from the input capture portion 29 to CPU 21 and CPU 21 executes a processing at ignition timing shown in FIG. 2 as an interruption processing in correspondence with the ignition interruption request.

First, at step (hereinafter, simply described as "S") 110, CPU 21 initializes a peak hold value PH of the ion current detecting signal Vi#1 to 0 and initializes also a count value CNT to 0 at successive S120.

Figure 3:
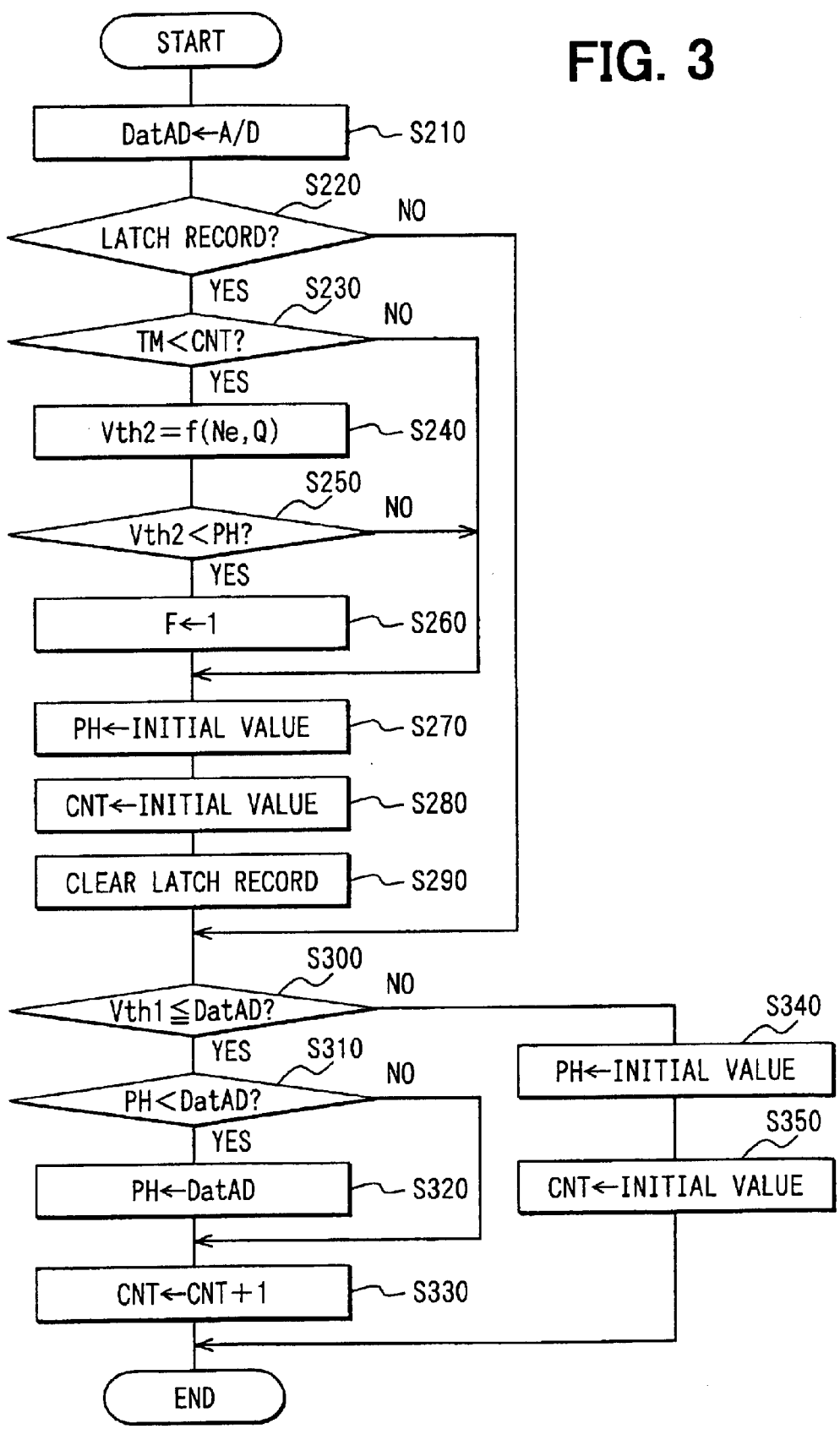
FIG. 3 is a flowchart showing an A/D interruption processing executed at every constant time period by the microcomputer according to the first embodiment.

Further, at next S130, CPU 21 initializes a firing/misfire determinant F indicating a determination result of whether a combustion condition of a cylinder constituting a determination object at this time (here, first cylinder #1) is a firing or a misfire, to 0 indicating a misfire, permits to start an A/D interruption processing shown in FIG. 3 at final S140 and thereafter finishes the processing at ignition timing.

Thereafter, as shown by triangular marks "∇" in FIG. 5, the A/D interruption processing of FIG. 3 is executed at every constant time period T (100 µs according to the embodiment).

When CPU 21 starts executing the A/D interruption processing of FIG. 3, first, at S210, CPU 21 subjects the ion current detecting signal Vi#1 to A/D conversion by the A/D converter 25 and stores an A/D conversion value thereof as an A/D conversion value DatAD at this time.

Next, at S220, CPU 21 determines whether there is latch record in the latch circuit 27#1, that is, whether the 1 bit data of the latch circuit 27#1 becomes 1. When there is not the latch record, CPU 21 proceeds to S300 and determines the A/D conversion value DatAD at this time stored to S210 is equal to or larger than the reference voltage Vth1. Further, as the reference voltage Vth1 used in determination at S300, a theoretical value of the reference voltage Vth1 determined by resistance values of the resistors 5 and 7 and power source voltage may previously be stored, or the actual reference voltage Vth1 produced at a connection point of the resistors 5 and 7 may be stored by being subjected to A/D conversion by the A/D converter 25.

When it is determined that the A/D conversion value DatAD at this time is equal to or larger than the reference voltage Vth1 at S300, CPU 21 proceeds to S310 and determines whether the A/D conversion value DatAD at this time is larger than a current peak hold value PH and when it is determined affirmatively, at successive S320, the peak hold value PH is updated to a value of the A/D conversion value DatAD at this time.

Further, when the peak hold value PH is updated at S320 or when it is negatively determined at S310 such that the A/D conversion value DatAD at this time is not larger than the current peak hold value PH, CPU 21 proceeds to S330, increments the current count value CNT by 1 and thereafter finishes the A/D interruption processing.

Further, when it is determined at S300 that the A/D conversion value DatAD at this time is not equal to or larger than the reference voltage Vth1, CPU 21 proceeds to S340, initializes the peak hold value PH to 0, initializes also the count value CNT to 0 at successive S350 and thereafter finishes the A/D interruption processing.

Meanwhile, when it is determined that there is latch record in the latch circuit 27#1 at S220, CPU 21 proceeds to S230, determines whether the count value CNT is larger than a predetermined value TM corresponding to a predetermined number of times (according to the embodiment, for example, TM=4) and proceeds to S240 when the count value CNT is larger than the predetermined value TM.

At S240, there is calculated a determination level Vth2 for determining whether the combustion condition of the first cylinder #1 is a firing or a misfire from rotational number Ne and load Q constituting a current state of operating the engine. Further, the determination level Vth2 is calculated to a value always larger than a maximum value in a tolerance range in view of design of the reference voltage Vth1 produced by the resistors 5 and 7. In other words, the reference voltage Vth1 is set to a value smaller than the determination level Vth2 set in accordance with the state of operating the engine.

Next, at S250, large or small is compared between the determination level Vth2 calculated at S240 and the peak hold value PH, it is determined whether the peak hold value PH is larger than the determination level Vth2 and when the peak hold value PH is larger than the determination level Vth2, it is determined that the combustion condition of the first cylinder #1 is a firing and CPU 21 proceeds to S260 and sets the firing/misfire determinant F to 1 indicating a firing.

Further, at successive S270, CPU 21 initializes the peak hold value PH to 0 and initializes also the count value CNT to 0 at successive S280. Further, at successive S290, CPU 21 clears the latch record of the latch circuit 27#1 (that is, the 1 bit data of the latch circuit 27#1 is cleared to 0) and thereafter, proceeds to S300, mentioned above).

Further, when it is negatively determined at S250 such that the peak hold value PH is not larger than the determination level Vth2, CPU 21 proceeds to S270 without executing the processing at S260 (that is, without determining that the combustion condition of the first cylinder #1 is a firing).

Further, CPU 21 initializes the peak hold value PH and the count value CNT to 0 (S270, S280), clears the latch record of the latch circuit 27#1 (S290) and thereafter proceeds to S300, mentioned above.

Meanwhile, when it is determined at S230 that the counter value CNT is not larger than the predetermined value TM, CPU 21 proceeds to S270 as it is without carrying out the processings of S240 through S260, initializes the peak hold value PH and the count value CNT to 0 (S270, S280), clears the latch record of the latch circuit 27#1 (S290) and thereafter proceeds to S300, mentioned above.

Figure 4:
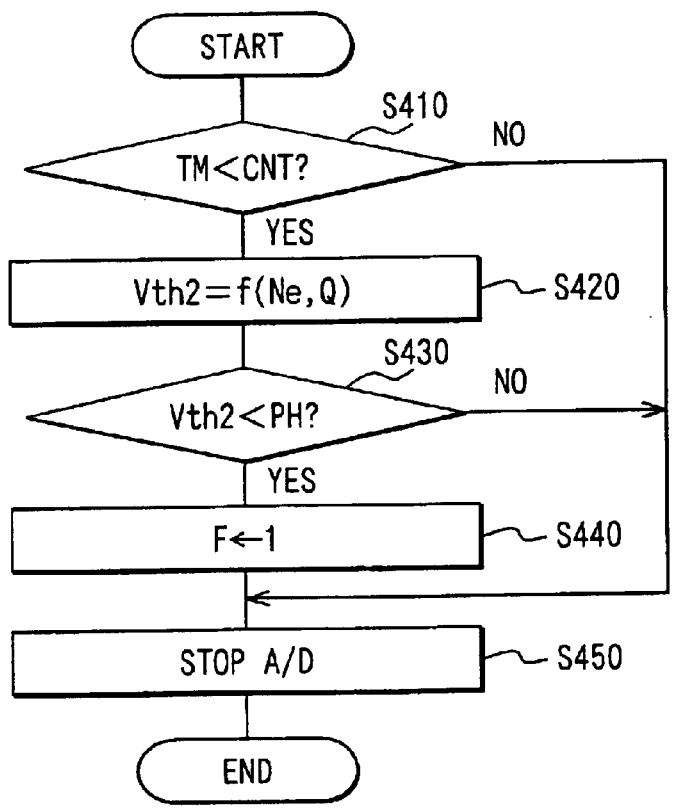
FIG. 4 is a flowchart showing a firing/misfire determining processing executed at a timing of ATDC60° CA by the microcomputer according to the first embodiment.

Further, CPU 21 of the microcomputer 9 executes a firing/misfire determination processing shown in FIG. 4 when a timing of a specific crank angle after the ignition timing (timing of ATDC60° CA shown at a right upper side of FIG. 5 according to the embodiment) is reached. Further, the timing of ATDC60° CA refers to a timing at which the crank angle advances from an upper dead center (TDC) by 60°.

When CPU 21 starts executing the firing/misfire determination processing of FIG. 4, first, at S410, CPU 21 determines whether the count value CNT at the time is larger than the predetermined value TM and when the counter value CNT is larger than the predetermined value TM, CPU 21 proceeds to S420 and calculates the determination level Vth2 for determining whether the combustion condition of the first cylinder #1 is a firing or a misfire from the rotation number Ne and the load Q of the engine similar to S240 of FIG. 3.

Next, at S430, large or small is compared between the determination level Vth2 calculated at S420 and the peak hold value PH, it is determined whether the peak hold value PH is larger than the determination level Vth2 and when the peak hold value PH is larger than the determination level Vth2, it is determined that the combustion condition of the first cylinder #1 is a firing and CPU 21 proceeds to S440 and sets the firing/misfire determinant F to 1 indicating a firing.

Further, at successive S450, it is prohibited that the A/D interruption processing of FIG. 3 is started, thereafter, the firing/misfire determination processing is finished.

Further, when it is negatively determined at S430 such that the peak hold value PH is not larger the determination level Vth2, CPU 21 proceeds to S450 as it is without determining that the combustion condition of the first cylinder #1 is a firing, prohibits the A/D interruption processing of FIG. 3 from being started and thereafter finishes the firing/misfire determination processing.

Meanwhile, when it is determined at S410 that the count value CNT is not larger than the predetermined value TM, CPU 21 proceeds to S450 as it is without carrying out processings of S420 through S440, prohibits the A/D interruption processing of FIG. 3 from being started and thereafter finishes the firing/misfire determination processing.

That is, the processings of S410 through S440 are processings the same as those of S230 through S260 of FIG. 3 and according to the firing/misfire determination processing, after carrying out the processings of S410 through S440, finally, the A/D interruption processing of FIG. 3 is prohibited from being started.

According to the combustion detecting apparatus 1 of the first embodiment, as shown by FIG. 5, during a time period from the ignition timing t0 (the fall timing of the ignition instruction signal IGT#1) to the timing t60 of ATDC60° CA, at every constant time period T(=100 $\mu$s), the A/D interruption processing of FIG. 3 is started and by the processing of initial S210, the ion current detection signal Vi#1 is subjected to the A/D conversion. Further, in FIG. 5, a value at A/D conversion is indicated by a black circle mark (●).

According to the combustion detecting apparatus 1 of the first embodiment, when the ion current detection signal Vi#1 traverses the reference voltage Vth1 during a time period of carrying out the A/D conversion at least by "TM+1"=5 times, the peak hold value PH until a preceding time is cleared without carrying out the processings of S240 through S260 in FIG. 3. Therefore, the A/D conversion values at the A/D conversion timings up to the above-described timing, are not used for determining the combustion condition.

Therefore, in the example of FIG. 5, the A/D conversion values from the ignition timing to a 9-th time of the A/D conversion timing, are not used for determining the combustion condition.

Further, when a number of times of A/D conversion during a time period in which the ion current detecting signal Vi#1 does not traverse the reference voltage Vth1 and is continuously equal to or larger than the reference voltage Vth1, is larger than TM(=4) and thereafter, the ion current detecting signal Vi#1 traverses the reference voltage Vth1, at an A/D conversion timing (a timing of executing A/D interruption processing) immediately thereafter, the combustion condition is determined based on the peak hold value PH until the preceding time before being erased and the peak hold value PH which has not been erased continuously over the A/D conversion timing larger than the predetermined number of times TM.

Therefore, according to the example of FIG. 5, the combustion condition is determined at an A/D conversion timing t18 at 18-th time from the ignition timing, by the peak hold value PH of the A/D conversion value during a time period from an A/D conversion timing t10 at 10-th time to an A/D conversion timing t17 at 17-th time.

Further, according to the example of FIG. 5, at the A/D conversion timing t18 of 18-th time, a firing is determined and the firing/misfire determinant F is set to 1.

Further, in FIG. 5, although the processings of S230 through S260 of FIG. 3 are not executed when the ion current detecting signal Vi#1 assumedly stays to be equal to or larger than the reference voltage Vth1 at and after the A/D conversion timing of 10-th time, in such a case, a firing or a misfire is finally determined by the firing/misfire determination processing of FIG. 4 started by the timing of ATDC60° CA.

According to the combustion detecting apparatus 1 of the first embodiment described above, even when there is produced noise having a period equal to or smaller than the A/D conversion period T in the ion current detection signal Vi#1, an A/D conversion value of the noise is not used in determining the combustion condition. For example, even when noise synchronized with the A/D conversion period is produced in the ion current detecting signal Vi#1 as exemplified in a time period from the ignition timing T0 to the A/D conversion timing t9 at 9-th time in FIG. 5, the signal of the noise is not erroneously determined to be a signal indicating a firing. Further, such an erroneous determination can be prevented without shortening the A/D conversion period T, the A/D conversion period T can be set to be long and therefore, the processing load can be alleviated.

Further, according to the first embodiment, the ion current detecting circuits 11#1 through 11#4 correspond to ion current detecting means, the A/D converter 25 and the processing at S210 correspond to A/D conversion means and the resistors 5 and 7 correspond to reference voltage producing means. Further, the comparators 15#1 through 15#4 and the latch circuits 27#1 through 27#4 correspond to voltage change storing means. Further, the processings at S310 and S320 correspond to A/D conversion value storing means and the peak hold value PH corresponds to a stored value of the A/D conversion value storing means. Further, the processings at S220, S270 and S290 correspond to erasing means and the processings at S230 to S260 correspond to combustion condition determining means.

Meanwhile, according to the above-described first embodiment, a direction of the ion current detecting signal Vi#n by which the latch circuit 27#n (n=1 through 4) constitutes a storing object, for traversing the reference voltage Vth1, may be either of the upper direction constituting the first direction and the lower direction constituting the second direction. Further, the processings at S340 and S350 in FIG. 3 may be deleted.

An explanation will be given of a combustion detecting apparatus according to a second embodiment as follows. Further, in the explanation with regard to the second embodiment, the same notations are used for constituent elements and signals the same as those of the first embodiment and a detailed explanation thereof will be omitted. Further, in the following, an explanation will be given of a portion thereof different from the first embodiment.

The combustion detecting apparatus according to the second embodiment differs from the combustion detecting apparatus 1 according to the first embodiment in respect to (1) and (2) described below.

Figure 2:
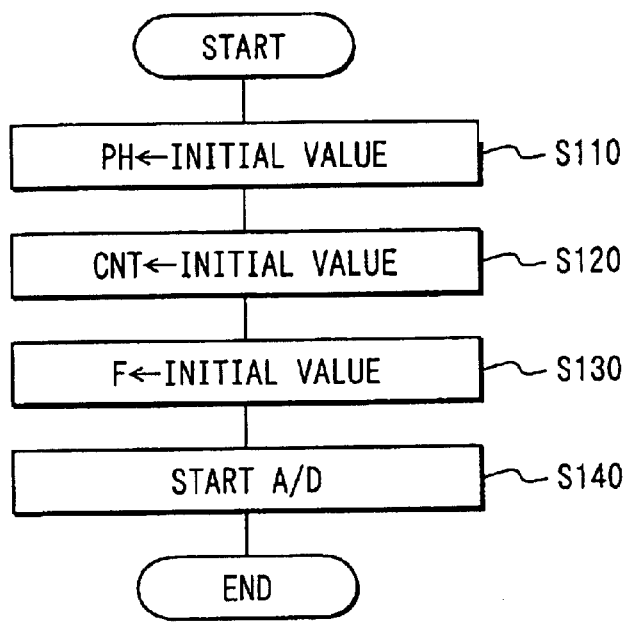
FIG. 2 is a flowchart showing a processing at an ignition timing executed at the ignition timing by the microcomputer according to the first embodiment.
Figure 6A:
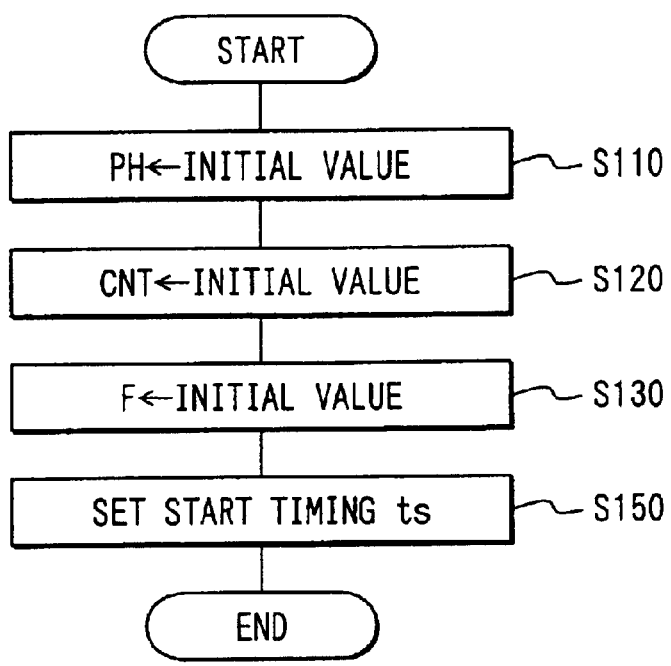
FIGS. 6A and 6B are flowcharts for explaining a combustion detecting apparatus according to a second embodiment.

(1) CPU 21 of the microcomputer 9 executes a processing at ignition timing of FIG. 6A in place of the processing at ignition timing of FIG. 2. Further, according to the processing at the ignition timing of FIG. 6A, when compared with the processing at the ignition timing of FIG. 2, at S150 substituting for S140, there is set start timing ts of a detecting window for executing determination of a combustion condition of a cylinder ignited at this time. Further, according to the second embodiment, although as the start timing, there is set a predetermined crank angle after the ignition timing and before ATDC60° CA, there may be set time from the ignition timing or an advanced angle value of the crank angle from the ignition timing.

Figure 6B:
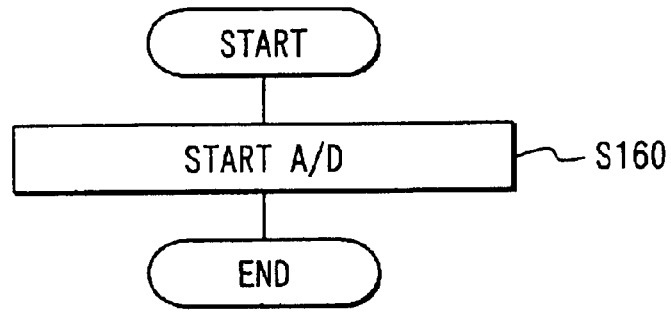

(2) CPU 21 of the microcomputer 9 executes a processing of starting the detecting window of FIG. 6B when the start timing ts set at S150 of FIG. 6A is reached. Further, CPU 21 permits to start the A/D interruption processing of FIG. 3 (S160) and thereafter finishes the processing of starting the detecting window.

Figure 7:
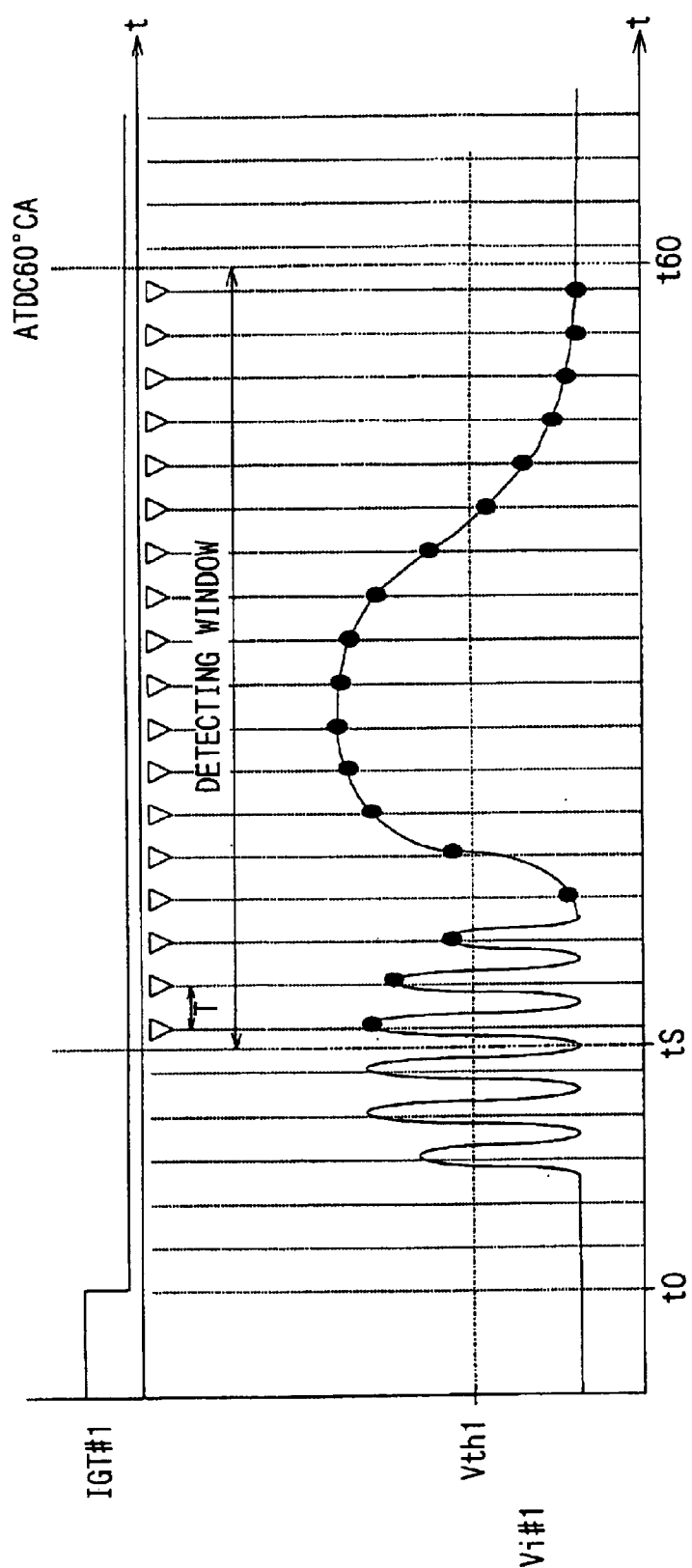
FIG. 7 is a time chart showing operation of the combustion detecting apparatus according to the second embodiment.

Then, thereafter, the A/D interruption processing of FIG. 3 is executed at every constant time period T (=100 μs) as shown by the triangular mark "∇" in FIG. 7.

Further, also in the second embodiment, when the timing of ATDC60° CA is reached, the firing/misfire determining processing of FIG. 4 is executed and at S450 of the firing/misfire determining processing, A/D interruption processing of FIG. 3 is prohibited from being started.

That is, according to the combustion detecting apparatus of the second embodiment, as shown by FIG. 7, a time period from the timing ts of the predetermined crank angle after the ignition timing t0 to the timing t60 of ATDC60° CA thereafter, is set to be the detecting window for executing to determine the combustion condition. In the detecting window, A/D interruption processing of FIG. 3 is executed at every constant time period T. According to the combustion detecting apparatus of the second embodiment, processing load of CPU 21 can be alleviated.

Further, according to the second embodiment, the processing at S150 of FIG. 6A, S160 of FIG. 6B, and S450 of FIG. 4 correspond to detecting window setting means.

Next, an explanation will be given of a combustion detecting apparatus according to a third embodiment. Further, in the explanation with regard to the third embodiment as follows, the same notations are used for constituent elements, signals and the like the same as those of the first and the second embodiments and a detailed explanation thereof will be omitted. Further, in the following, an explanation will be given mainly of a portion different from the first embodiment.

Figure 8:
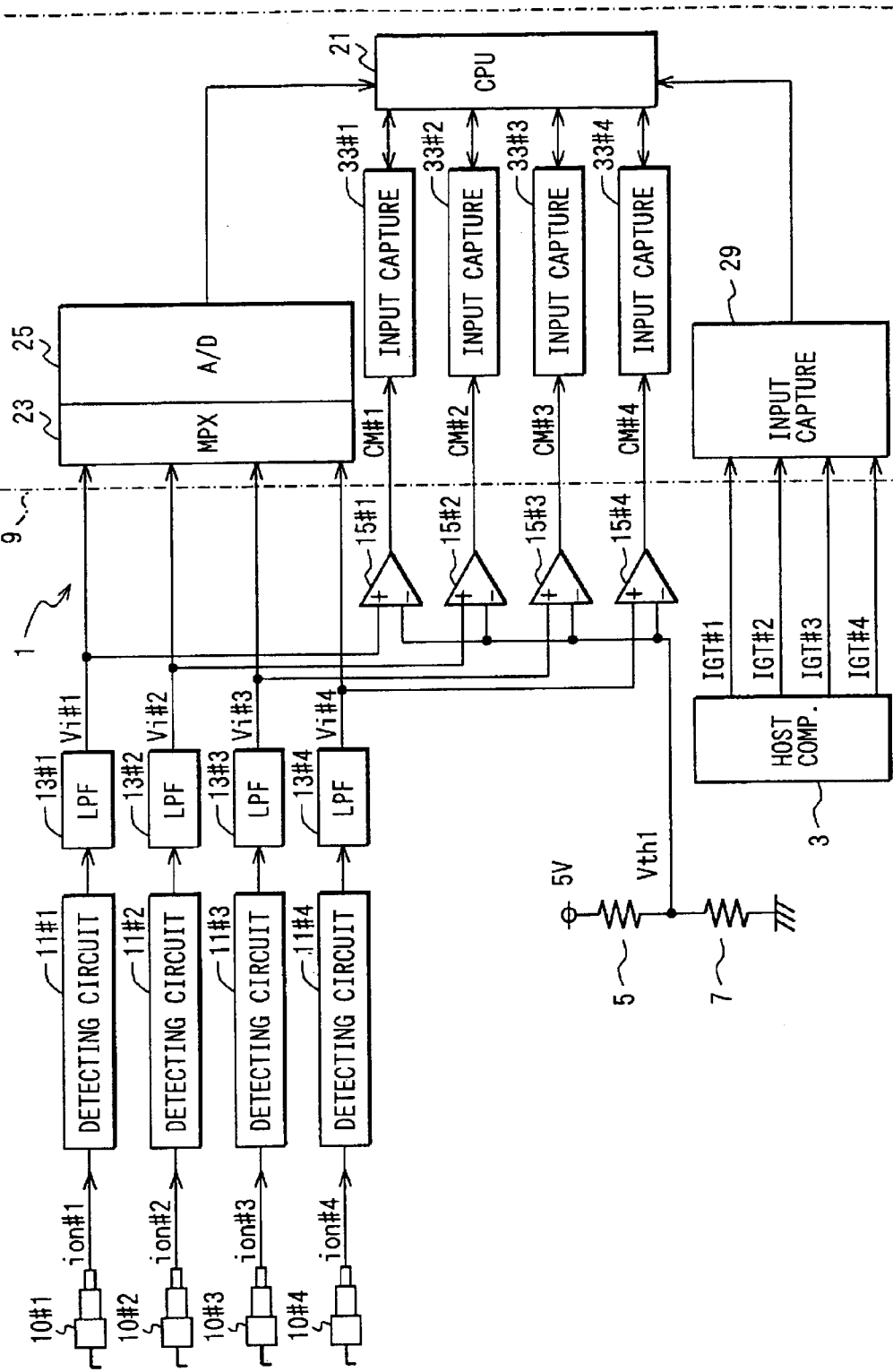
FIG. 8 is a constitution diagram showing a constitution of a combustion detecting apparatus according to a third embodiment along with a host microcomputer for controlling the engine.

First, as shown by FIG. 8, according to a combustion detecting apparatus 31 of the third embodiment, in comparison with the combustion detecting apparatus 1 of the first embodiment, at inside of the microcomputer 9, in place of the latch circuits 27#1 through 27#4, there are provided input capture portions 33#1 through 33#4 respectively inputted with the output signals CM#1 through CM#4 of the comparators 15#1 through 15#4.

Further, each input capture portion 33#n (n is any of 1 through 4) produces a first input capture interruption request to CPU 21 when the ion current detecting signal Vi#n traverses the reference voltage Vth1 in a direction (first direction) from a voltage side which is lower than the reference voltage Vth1 and does not indicate a firing to a high voltage side which indicates a firing to thereby produce a rise edge in the output signal CM#n of the comparator 15#n. Further, each input capture portion 33#n produces a second input capture interruption request to CPU 21 when the ion current detecting signal Vi#n traverses the reference voltage Vth1 in a direction (second direction) from a voltage side higher than the reference voltage Vth1 to a low voltage side to thereby produce a fall edge in the input signal CM#n of the comparator 15#n.

Next, an explanation will be given of processings executed at CPU 21 of the microcomputer 9 for determining the combustion condition of each cylinder in the combustion detecting apparatus 31 according to the third embodiment in reference to flowcharts of FIG. 9 through FIG. 14 and a time chart of FIG. 15. Further, although an explanation will be given here of a portion with regard to the first cylinder #1 in the respective cylinders #1 through #4, the same goes with the other cylinders #2 through #4.

Figure 15:
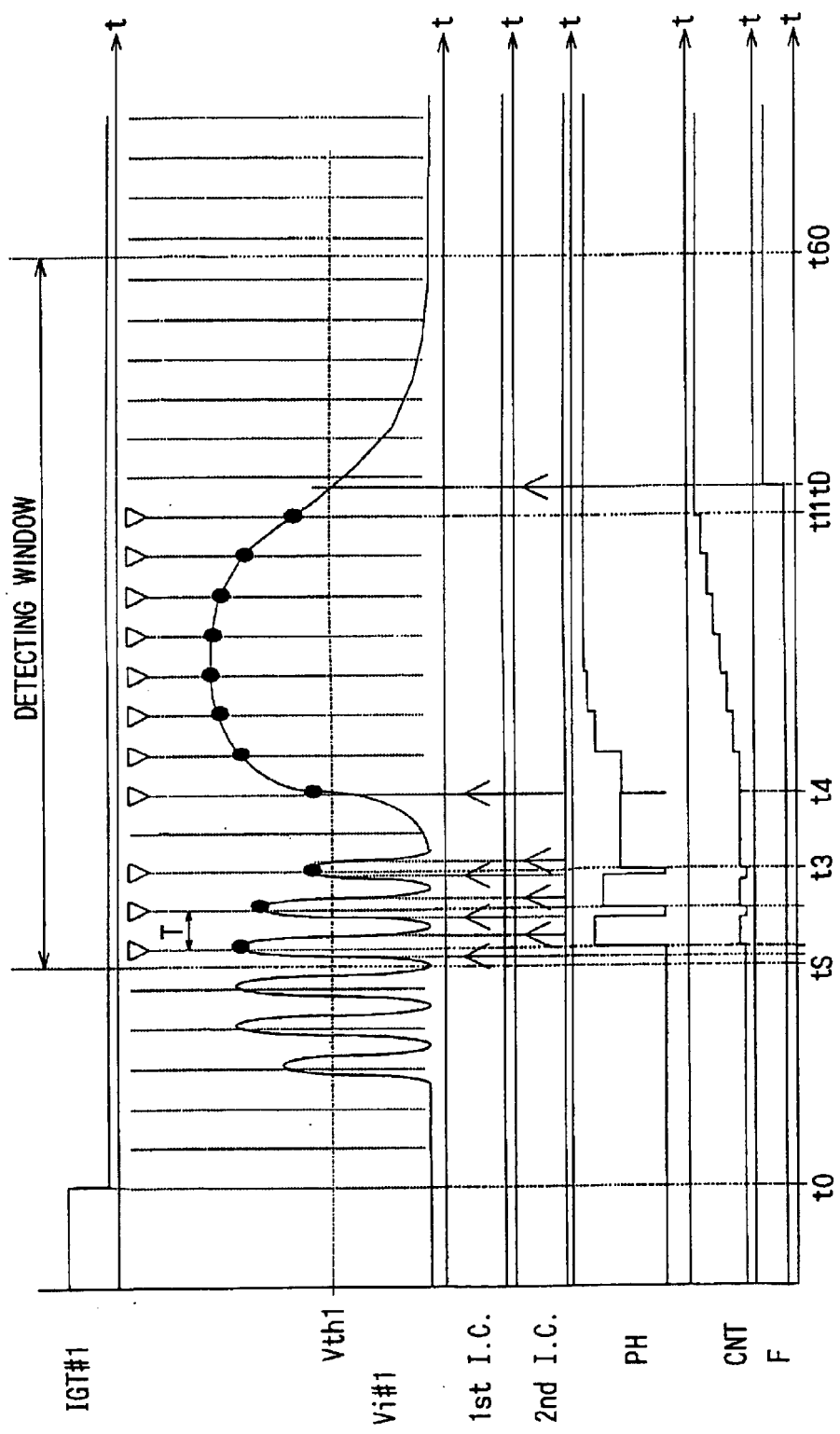
FIG. 15 is a time chart showing operation of a combustion detecting apparatus according to the third embodiment.
Figure 16:
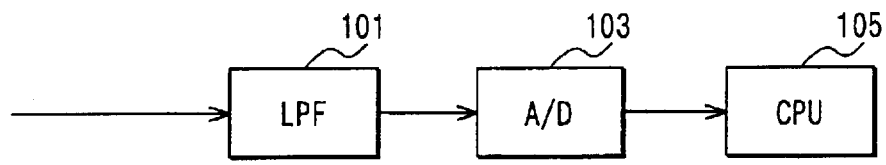
FIG. 16 is a block diagram showing a constitution of a combustion detecting apparatus according to a conventional technology.
Figure 17:
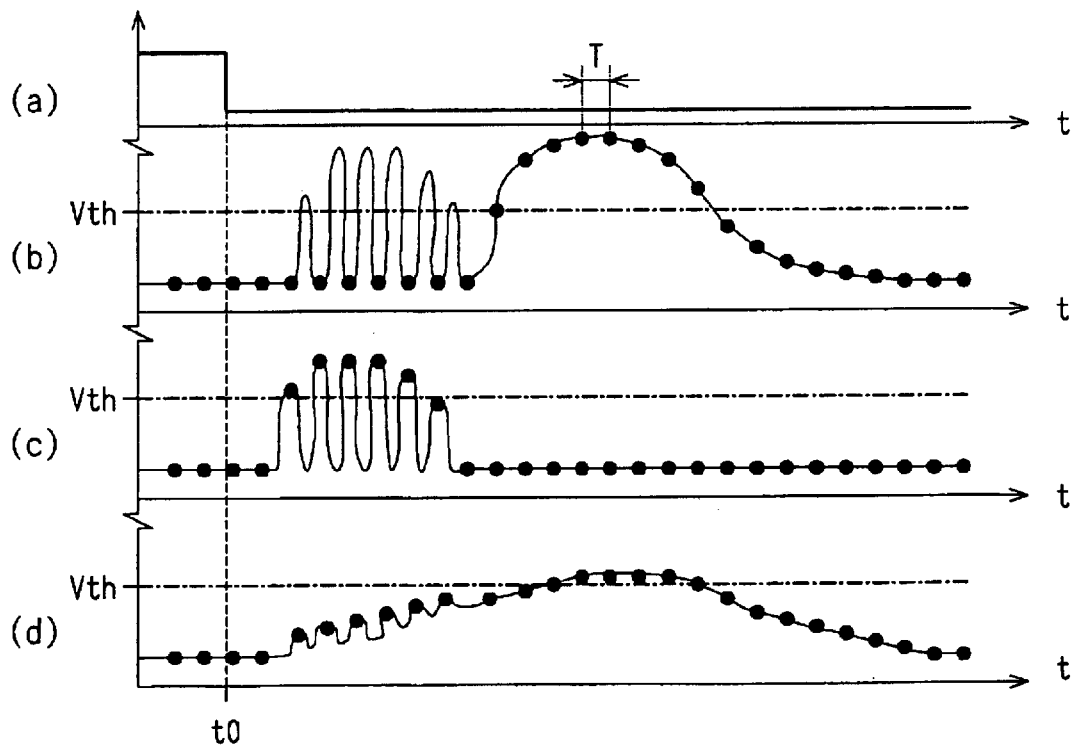
FIG. 17 is a time chart, (a), (b), (c), and (d) explaining a problem of the conventional technology.

First, the ignition instruction signal IGT#1 from the host microcomputer 3 falls as shown by FIG. 15 and an ignition is carried out for the first cylinder #1, and at the microcomputer 9, there is produced an ignition interruption request from the input capture portion 29 to CPU21. CPU 21 executes a processing at an ignition timing shown in FIG. 9 as an interruption processing in correspondence with the ignition interruption request.

Figure 9:
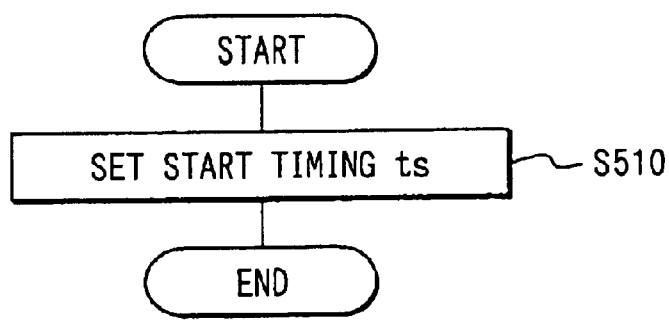
FIG. 9 is a flowchart showing a processing at an ignition timing executed at the ignition timing by the microcomputer according to the third embodiment.

Further, when CPU 21 starts executing a processing at ignition timing of FIG. 9, at S510, CPU 21 sets the start timing ts of the detecting window for executing to determine the combustion condition of the cylinder ignited at this time and thereafter finishes the processing at ignition timing. Further, although also according to the third embodiment, similar to the second embodiment, as the start timing of the detecting window, there is set a predetermined crank angle after the ignition timing, there may be set time from the ignition timing or an advanced angle value of the crank angle from the ignition timing.

Figure 10:
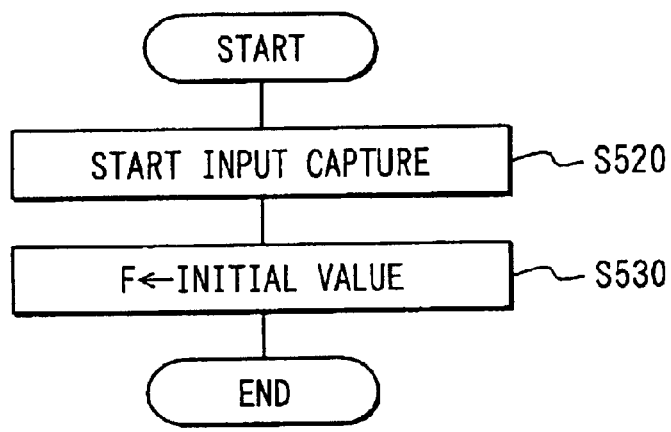
FIG. 10 is a flowchart showing a processing at a timing of starting a detecting window executed by a timing of starting the detecting window by the microcomputer according to the third embodiment.

Thereafter, when the start timing ts set at S510 is reached, CPU 21 executes a processing at a timing of starting the detecting window of FIG. 10.

Figure 11:
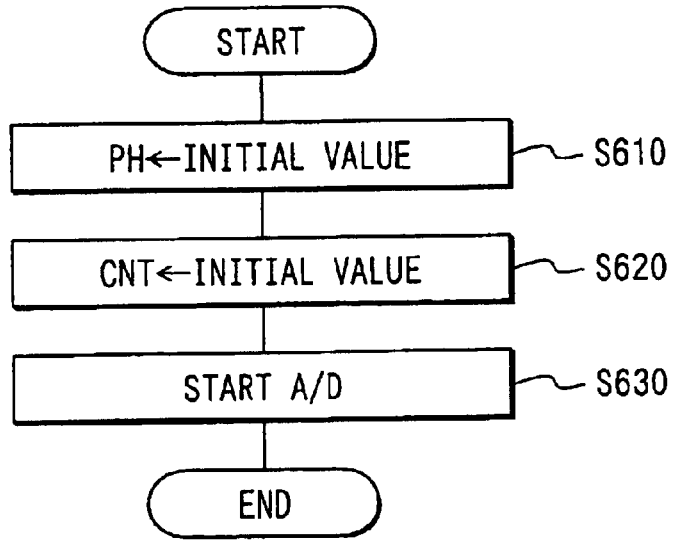
FIG. 11 is a flowchart showing an input capture interruption processing in generating a rise edge executed by the microcomputer according to the third embodiment.
Figure 13:
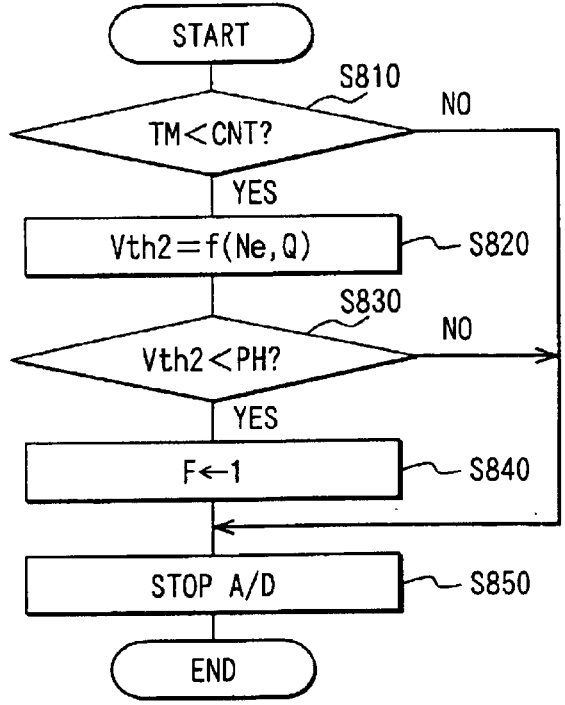
FIG. 13 is a flowchart showing an input caption interruption processing in generating a fall edge executed by the microcomputer according to the third embodiment.

Further, when CPU 21 starts executing the processing at the timing of starting the detecting window of FIG. 10, at first S520, CPU 21 permits to start an interruption processing of FIG. 11 in correspondence with the first input capture interruption request and an interruption processing of FIG. 13 in correspondence to the second input capture interruption request. Further, at successive S530, CPU 21 initializes the firing/misfire determinant F indicating the determination result of whether the combustion condition of the cylinder constituting the determination object at this time (here, the first cylinder #1) is a firing or a misfire, to 0 indicating a misfire and thereafter finishes the processing.

Meanwhile, when the interruption at S520 is permitted, thereafter, as shown by FIG. 15, CPU 21 executes the input capture interruption processing when the rise edge is produced as shown in FIG. 11 at every time of producing the first input capture interruption request. Further, as shown in FIG. 15, CPU 21 executes the input capture interruption processing when the fall edge is produced as shown in FIG. 13 at every time of producing the second input capture interruption request.

Here, first, when CPU 21 starts executing the processing shown in FIG. 11, at initial S610, CPU 21 initializes the peak hold value PH of the ion current detecting signal Vi#1 to 0 and initializes the count value CNT to 0 at successive S620. Next, at S630, CPU 21 permits to start an A/D interruption processing shown in FIG. 12 and thereafter finishes the processing.

Figure 12:
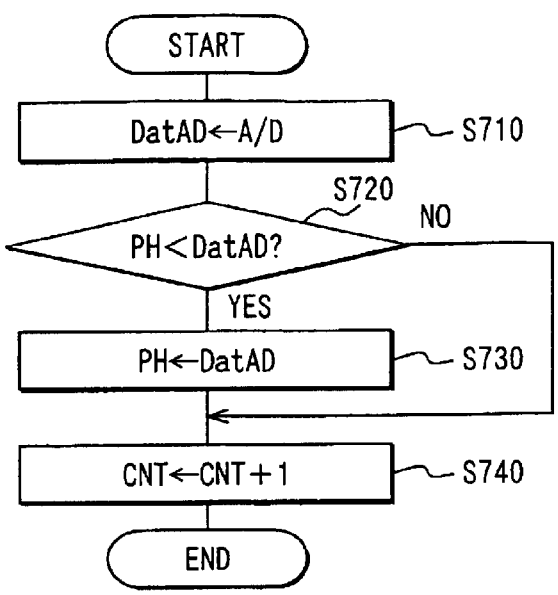
FIG. 12 is a flowchart showing an A/D interruption processing executed at every constant time period by the microcomputer according to the third embodiment.

Further, when the interruption at S630 is permitted, thereafter, as shown by the triangular mark "∇" in FIG. 15, the A/D interruption processing of FIG. 12 is executed at every constant time period T (100 μs according to the embodiment).

When CPU 21 starts executing the A/D interruption processing of FIG. 12, first, at S710, CPU 21 subjects the ion current detecting signal Vi#1 to A/D conversion by the A/D converter 25 and stores an A/D conversion value thereof as an A/D conversion value DatAD at this time.

Next, at S720, it is determined whether the A/D conversion value DatAD at this time is larger than the current peak hold value PH and when it is affirmatively determined, at successive S730, CPU 21 updates the peak hold value PH to a value of the A/D conversion value DatAD at this time.

Further, when the peak hold value PH is updated at S730 or it is negatively determined at S720 such that the A/D conversion value DatAD at this time is not larger than the current peak hold value PH, CPU 21 proceeds to S740, increments the count value CNT by 1 and thereafter finishes the A/D interruption processing.

Further, in a processing of FIG. 13, there is carried out a processing of a content the same as that of FIG. 4 according to the first embodiment.

That is, when CPU 21 starts executing the processing of FIG. 13, first, at S810, CPU 21 determines whether the count value CNT at the time is larger than the predetermined value TM (for example, TM=4 also in the third embodiment) and when the count value CNT is larger than the predetermined value TM, CPU 21 proceeds to S820 and calculates the determination level Vth2 for determining whether the combustion condition of the first cylinder #1 is a firing or a misfire from the rotational number Ne and the load Q of the engine.

Next, at S830, the large or small is compared between the determination level Vth2 calculated at S820 and the peak hold value PH, it is determined whether the peak hold value PH is larger than the determination level Vth2 and when the peak hold value PH is larger than the determination level Vth2, it is determined that the combustion condition of the first cylinder #1 is a firing, CPU 21 proceeds to S840 and sets the firing/misfire determinant F to 1 indicating a firing.

Further, at successive S850, CPU 21 prohibits the A/D interruption processing of FIG. 12 from being started and thereafter finishes the input capture interruption processing.

Further, when it is negatively determined such that the peak hold value PH is not larger than the determination level Vth2 at S830, CPU 21 proceeds to S850 as it is without determining that the combustion condition of the first cylinder #1 is a firing.

Meanwhile, when it is determined that the count value CNT is not larger than the predetermined value TM at S810, CPU 21 proceeds to S850 as it is without executing the processings of S820 through S840.

Figure 14:
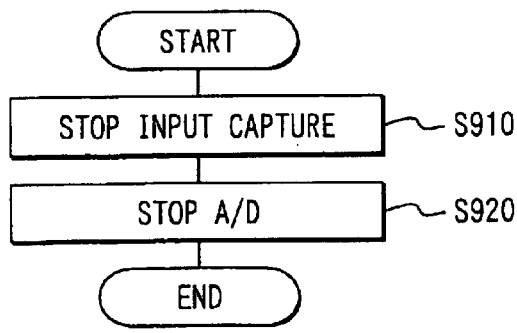
FIG. 14 is a flowchart showing a processing at a timing of finishing a detecting window executed at a timing of finishing the detecting window by the microcomputer according to the third embodiment.

Further, CPU 21 of the microcomputer 9 executes a processing at a detecting window finishing timing shown in FIG. 14 when there is reached a timing of a specific crank angle after the start timing ts (for example, timing of ATDC60° CA) and a timing t60 of finishing the detecting window.

Further, when CPU 21 starts executing the processing of FIG. 14, first, at S910, CPU 21 prohibits to start the both input capture interruption processings of FIG. 11 and FIG. 13, prohibits to start the A/D interruption processing of FIG. 12 at successive S920 and thereafter finishes the processing at the detecting window finishing timing.

According to the combustion detecting apparatus 31 of the third embodiment for carrying out the above-described processings, when an explanation is given to, for example, the first cylinder #1, during a time period from executing the input capture interruption processing of FIG. 11 when the ion current detecting signal Vi#1 traverses the reference voltage Vth1 in the upward direction to executing the input capture interruption processing of FIG. 13 when the ion current detecting signal Vi#1 traverses the reference voltage Vth1 in the lower direction, at every constant time period T (=100 $\mu$s), the A/D interruption processing of FIG. 12 is started, by the first processing at S710, the ion current detecting signal Vi#1 is subjected to the A/D conversion, by the processings of S720 and S730, there is executed the peak hold processing for detecting a maximum value of A/D conversion value and updating and storing the maximum value as the peak hold value PH, further, by the processing of S740, there is incremented by 1, the count value CNT for counting the number of times of the A/D conversion from traversing the reference voltage Vth1 in the upper direction to traversing the reference voltage Vth1 in the lower direction by the ion current detecting signal Vi#1 (in other words, a number of times of the executing the A/D interruption processing during a time period in which the ion current detecting signal Vi#1 is continuously equal to or larger than the reference voltage Vth1).

Further, according to the input capture interruption processing of FIG. 13 executed when the ion current detecting signal Vi#1 traverses the reference voltage Vth1 in the lower direction, by the processing of S810, it is determined from the count value CNT whether the number of times of the A/D conversion from traversing the reference voltage Vth1 in the upper direction to traversing the reference voltage Vth1 in the lower direction is more than a predetermined number of times TM by the ion current detecting signal Vi#1, and when it is affirmatively determined at S810, by the processings of S820 through S840, the combustion condition of the first cylinder #1 is determined from the peak hold value PH at that occasion.

According to the combustion detecting apparatus 31 of the third embodiment, when the ion current detecting signal Vi#1 traverses the reference voltage Vth1 in the lower direction until the A/D conversion of the ion current detecting signal Vi#1 is executed at least by "TM+1" times from when the ion current detecting signal Vi#1 traverses the reference voltage Vth1 in the upper direction, the A/D conversion value at the A/D conversion timing until that time, is not used in determining the combustion condition of the engine. Therefore, in the example of FIG. 15, the A/D conversion value from the timing ts of starting the detecting window to an A/D conversion timing t3 of a 3-th time is not used for determining the combustion condition.

Further, when there are present the A/D conversion timings more than TM times during the time period of traversing the reference voltage Vth1 in the upper direction to traversing the reference voltage Vth1 in the lower direction by the ion current detecting signal Vi#1, the combustion condition is determined from the peak hold value PH of the A/D conversion value during the time period. Therefore, in the example of FIG. 15, by the input capture interruption processing of FIG. 13 executed at time tD, the combustion condition is determined by the peak hold value PH of the A/D conversion value during a time period from an A/D conversion timing t4 at 4-th time to an A/D conversion timing t11 at 11th time. Further, in the example of FIG. 15, by the input capture interruption processing of FIG. 13 executed at time tD, a firing is determined and the firing/misfire determinant F is set to 1.

Also by the combustion detecting apparatus 31 of the third embodiment described above, similar to the combustion detecting apparatus 1 of the first embodiment, even when there is produced noise having a period equal to or smaller than the A/D conversion period T in the ion current detecting signal Vi#1, a signal of the noise is not erroneously determined as a signal indicating a firing, further, such an erroneous determination can be prevented without shortening the A/D conversion period T, the A/D conversion period T can be set to be long and therefore, the processing load can be alleviated.

Further, also by the combustion detecting apparatus 31 according to the third embodiment, similar to the combustion detecting apparatus according to the second embodiment, a time period from a timing of a predetermined crank angle after the ignition timing (processing timing of FIG. 10) to the timing of ATDC60° CA thereafter (processing timing of FIG. 14), is set as the detecting window for executing to determine the combustion condition, the processings of FIG. 11 through FIG. 13 are executed in the detecting window and therefore, the processing load of CPU 21 can be alleviated.

Further, according to the third embodiment, the A/D converter 25 and the processing of S710 correspond to A/D conversion means. Further, according to the third embodiment, the comparators 15#1 through 15#4 and the input capture portion 33#1 through 33#4 correspond to voltage change informing means. That is, because according to the third embodiment, when the ion current detecting signal Vi#n (n=1 through 4) traverses the reference voltage Vth1 in the upper direction, the operation is informed from the input capture portion 33#n to CPU 21 in the form of the first input capture interruption request, when the ion current detection signal Vi#n traverses the reference voltage Vth1 in the lower direction, the operation is informed from the input capture portion 33#n to CPU 21 in the form of the second input capture interruption request. Further, according to the third embodiment, the processings of S720 and S730 correspond to A/D conversion value storing means and the peak hold value PH corresponds to the stored value of the A/D conversion value storing means. Further, the processing of S810 corresponds to determining means and the processings of S820 through S840 correspond to combustion condition determining means. Further, the processings of FIG. 9, FIG. 10 and FIG. 14 correspond to detecting window setting means.

Although an explanation has been given of the embodiments of the invention as described above, the invention can adopt various modes.

For example, in the above-described second and third embodiments, also the timing of finishing the detecting window may be set by time from the ignition timing or an advanced angle value of the crank angle from the ignition timing.

Further, although according to the above-described respective embodiments, the peak hold processing is executed for the A/D conversion value of the ion current detecting signal Vi#n (n=1 through 4) and the combustion condition is determined from the peak hold value PH, for example, the A/D conversion value may be integrated and the combustion condition may be determined from an integrated value thereof.

Specifically explaining, with regard to the first and the second embodiments, in place of the processings of S310 and S320 of FIG. 3, there is executed an integrating processing of adding the A/D conversion value DatAD at current time to an integrated value up to the preceding time to thereby provide a new integrated value (that is, accumulated addition processing). Further, at S110 of FIG. 2 or FIG. 6 and S270 of FIG. 3, the integrated value may be initialized to 0 and at S240 through S260 of FIG. 3 and S420 through S440 of FIG. 4, the steps may be set to determine the combustion condition by comparing the integrated value and a determination level in accordance with the state of operating the engine. Further, with regard to the third embodiment, in place of the processings of S270 and S730 of FIG. 12, there is executed an integration processing of adding the A/D conversion value DatAD at current time to an integrated value up to preceding time to thereby provide a new integrated value. Further, at S610 of FIG. 11, the integrated value may be initialized to 0 and at S820 through S840 of FIG. 13, the steps may be set to determine the combustion condition by comparing the integrated value and a determination level in accordance with the state of operating the engine.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A combustion detecting apparatus of an engine comprising:
   ion current detecting means for detecting an ion current flowing in electrodes of a spark plug of an engine and outputting an ion current detecting signal having a voltage in accordance with the ion current;
   A/D conversion means for subjecting the ion current detecting signal to A/D conversion at every predetermined time period;
   reference voltage producing means for producing a reference voltage large or small of which is compared with the ion current detecting signal;
   voltage change storing means for comparing the ion current detecting signal and the reference voltage and storing that the ion current detecting signal traverses the reference voltage;
   A/D conversion value storing means for storing an A/D conversion value by the A/D conversion means;
   erasing means for determining whether the ion current detecting signal is stored to traverse the reference voltage in the voltage change storing means, erasing a stored value of the A/D conversion value storing means prior to an A/D conversion timing at current time and erasing a memory of the voltage change storing means when the reference voltage is stored to be traversed at every timing of subjecting the ion current detecting signal to A/D conversion by the A/D conversion means (hereinafter, referred to as A/D conversion timing); and
   combustion condition determining means for determining a combustion condition of the engine based on a stored value of the A/D conversion value storing means which has not been erased by the erasing means continuously over A/D conversion timings of more than a predetermined number of times.

2. The combustion detecting apparatus of an engine according to claim 1, further comprising:
   detecting window setting means for setting a detecting window for determining the combustion condition of the engine;
   wherein the A/D conversion means, the A/D conversion value storing means and the erasing means are operated only in the detecting window.

3. The combustion detecting apparatus of an engine according to claim 1, wherein the A/D conversion value storing means is constituted to detect a maximum value of the A/D conversion value by the A/D conversion means and store the maximum value.

4. The combustion detecting apparatus of an engine according to claim 3, wherein the combustion condition determining means determines the combustion condition of the engine by comparing large or small between a determinant which is larger in a direction of indicating the firing than a tolerance range in designing the reference voltage produced by the reference voltage producing means and a determinant set in accordance with a state of operating the internal combustion engine, and the stored value of the A/D conversion value storing means.

5. The combustion detecting apparatus of an engine according to claim 1, wherein the A/D conversion value storing means is constituted to integrate the A/D conversion value by the A/D conversion means and store an integrated value thereof.

6. A combustion detecting apparatus of an engine comprising:
   ion current detecting means for detecting an ion current flowing in electrodes of a spark plug of an engine and outputting an ion current detecting signal having a voltage in accordance with the ion current;
   A/D conversion means for subjecting the ion current detecting signal to A/D conversion at every predetermined time period;
   reference voltage producing means for producing a reference voltage large or small of which is compared with the ion current detecting signal;
   voltage change informing means for informing that the ion current detecting signal traverses the reference voltage in a first direction constituting a direction from a voltage side which does not indicate a firing to a voltage side which indicates a firing in comparison with the reference voltage (hereinafter, referred to as traversing in the first direction) and that the ion current detecting signal traverses the reference voltage in a second direction constituting a direction from the voltage side which indicates a firing to the voltage side which does not indicate a firing in comparison with the reference voltage (hereinafter, referred to as traversing in the second direction) by comparing the ion current detecting signal and the reference voltage;

A/D conversion value storing means for storing an A/D conversion value by the A/D conversion means during a time period from when the traversing in the first direction is informed by the voltage change informing means to when traversing in the second direction is informed thereby;

determining means for determining whether a number of times of A/D conversion by the A/D conversion means from when the traversing in the first direction is informed by the voltage change informing means to when traversing in the second direction is informed thereby is larger than a predetermined number of times; and combustion condition determining means for determining a combustion condition of the engine based on a stored value of the A/D conversion value storing means when the number of times of the A/D conversion is determined to be larger than the predetermined number of times by the determining means.

7. The combustion detecting apparatus of an engine according to claim 6, further comprising:

detecting window setting means for setting a detecting window for determining the combustion condition of the engine;

wherein the A/D conversion means, the A/D conversion value storing means and the determining means are operated only in the detecting window.

8. The combustion detecting apparatus of an engine according to claim 6, wherein the A/D conversion value storing means is constituted to detect a maximum value of the A/D conversion value by the A/D conversion means and store the maximum value.

9. The combustion detecting apparatus of an engine according to claim 8, wherein the combustion condition determining means determines the combustion condition of the engine by comparing large or small between a determinant which is larger in a direction of indicating the firing than a tolerance range in designing the reference voltage produced by the reference voltage producing means and a determinant set in accordance with a state of operating the internal combustion engine, and the stored value of the A/D conversion value storing means.

10. The combustion detecting apparatus of an engine according to claim 6, wherein the A/D conversion value storing means is constituted to integrate the A/D conversion value by the A/D conversion means and store an integrated value thereof.

11. An apparatus for determining combustion condition of an engine, comprising:

electrodes disposed in a combustion chamber of the engine;

an ion current detecting circuit connected to the electrodes, which outputs analog signal having level indicative of combustion condition;

an A/D converter circuit connected to the ion current detecting circuit, which outputs digital signal indicative of the level of the analog signal at intervals;

a comparator circuit connected to the ion current detecting circuit, which inputs the analog signal and detects a unstable change of the level of the analog signal during at least the intervals, the unstable change being indicative of a change of the combustion condition from a predetermined combustion condition to another combustion condition; and a controller connected to the A/D converter circuit and the comparator circuit, which inputs the digital signal from the A/D converter and an output from the comparator circuit, wherein the controller determines whether the predetermined combustion condition is generated based on the digital signal which is obtained when the unstable change of the level of the analog signal is not detected by the comparator circuit for a predetermined time period.

12. The apparatus for determining combustion condition of an engine according to claim 11, wherein the controller determines whether the combustion condition is a firing or a misfire.

13. The apparatus for determining combustion condition of an engine according to claim 12, wherein the comparator circuit compares the analog signal with a first threshold value that is set to discriminate between the firing and the misfire, and the controller compares the digital signal with a second threshold value that is set to discriminate between the firing and the misfire too.

14. The apparatus for determining combustion condition of an engine according to claim 13, wherein the first threshold value is fixed, and the second threshold value is variable in accordance with an operating condition of the engine.

* * * * *